Figures 1, 2, 3:
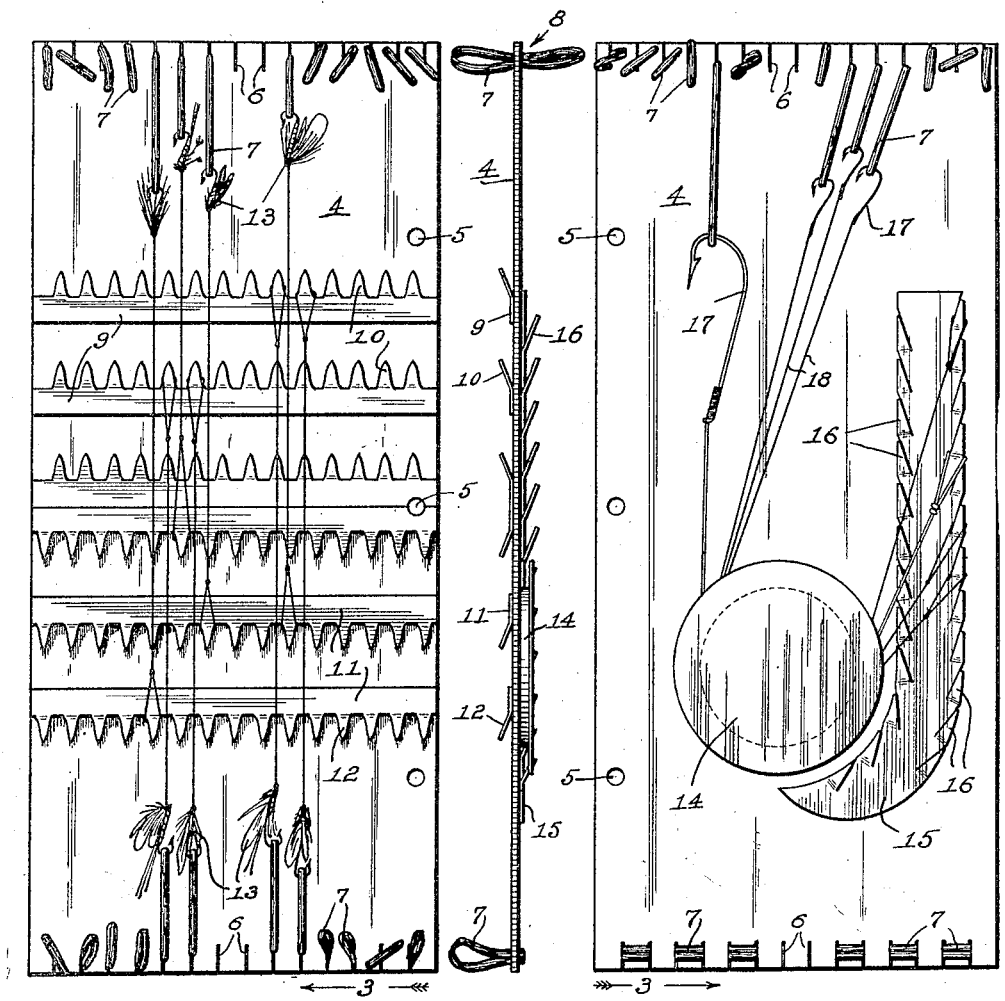

April 15, 1924.

N. C. FIGLEY

FLY BOOK LEAF

Filed Nov. 4, 1922

Inventor;
Newton C. Figley, per A. K. Martell

Attorney.

Patented Apr. 15, 1924.

1,490,370

UNITED STATES PATENT OFFICE.

NEWTON C. FIGLEY, OF LOS ANGELES, CALIFORNIA.

FLY-BOOK LEAF.

Application filed November 4, 1922. Serial No. 599,095.

*To all whom it may concern:*

Be it known that I, NEWTON C. FIGLEY, a citizen of the United States, residing at Los Angeles, in the county of Los Angeles and State of California, have invented new and useful Improvements in Fly-Book Leaves, of which the following is a specification.

My invention relates to fly books for the use of fishermen; and the objects of my invention are, first, to provide a loose leaf adapted for use in a book of this nature; second, to afford facilities for attaching flies and bait hooks to the leaf in an orderly and convenient manner; and, third, to furnish means for maintaining the snells under a moderate tension, the loops being spread, to insure their remaining straight, and with the loops open, when removed.

Other objects and advantages will appear hereinafter, and while I show herewith and will describe a preferred form of construction, I desire to be understood that I do not limit myself to such preferred form, but that various changes and adaptations may be made therein without departing from the spirit of my invention as hereinafter claimed.

My objects are attained by means of the device illustrated in the accompanying drawing, in which:

Figure 1 is an elevation of the fly side of my improved leaf and Fig. 2 is an elevation of the reverse, or bait hook, side of the same. Figure 3 is an edge elevation of the leaf seen when looking in the direction of arrow 3 as indicated in Fig. 1 and Fig. 2.

Similar numerals refer to similar parts throughout the several views.

I prefer to construct the leaf body 4 of heavy polished white celluloid that is about $\frac{1}{16}$ inch in thickness and relatively very strong. Near one of the side margins of this are holes 5 for binding the leaf in a fly book, as by leather thongs or other convenient means. Both the top and bottom ends of the leaf are provided with a series of parallel slits, or narrow kerfs 6, and into these are inserted small rubber bands 7. The bands are put into the slits when rather strongly stretched so as to be sufficiently tenuous, and so that when relaxed they will be tightly gripped by the walls of the slit.

The rubber bands at the top of the leaf are inserted in the slits in the manner indicated most clearly at 8 in Fig. 3, and so as to have a bight at each side of the leaf. At the bottom of the leaf the bights of the bands are all made to project from the fly side of the leaf by doubling the band in adjacent slits, in the manner shown in the drawing.

On the face of the fly side, above the middle, are cemented a number of transverse serrate strips 9, with their teeth or prongs 10 bent outwardly from the face of the leaf as shown in Fig. 3, and projecting upwards. Similarly there are a number of serrate strips 11 cemented below the middle, with their prongs 12 bent outwardly, and projecting downwards. The prongs of each set of strips are in vertical arrangement, but the prongs of the upper strips are staggered with reference to those of the lower strips.

Flies 13 are attached to the leaf by hooking them in the rubber bands, pulling on the snells to stretch the bands, and passing the loops of the snells over the prongs at the other end of the leaf. The tension of the bands keeps the snells taut so that they will always remain straight; and because of the manner in which the loops are spread by the prongs, they will remain open when removed.

On the bait hook side of the leaf I cement a relatively large diameter, but very short, flanged cylinder 14, and a hook shaped strip 15 having serrated edges and prongs 16 bent outwardly and projecting upwards.

Bait hooks 17 are attached to the leaf by hooking in the rubber bands, pulling the leaders 18 around cylinder 14 to stretch the bands and passing the loops of the leaders over the prongs 16. Leaders having a length greater than that of the leaf are stretched in this manner.

Strip 15 is made hook shape at the bottom in order that its prongs may be pointed in a direction suitable for engaging the loops of the short leaders coming tangentially off cylinder 14.

As many leaves of my construction as desired may be inserted in a fly book and should be separated by chamois pads between them. In this manner the hooks and flies on one leaf are prevented from fouling those on the adjacent leaf, and are always ready for detachment and use.

I claim as my invention:

1. In a fly book a stiff leaf having kerfed edges immediately engaging elastic bands, and prongs projecting from its surface; and a short flanged cylinder of relatively large diameter perpendicularly attached to said surface; said parts being cooperative and adapted for stretching leaders between said prongs and the bights of said bands tangentially to said cylinder.

2. In a fly book a stiff leaf having kerfed edges and a plurality of rubber bands intermediately gripped by the walls of said kerfs; and a plurality of prongs and a short flanged cylinder of relatively large diameter projecting from the surface of said leaf; said parts being adapted to cooperate for stretching leaders partially around said cylinder between said prongs and the bights of said bands.

NEWTON C. FIGLEY.